(12) United States Patent
Fukuyo et al.

(10) Patent No.: US 11,953,945 B2
(45) Date of Patent: Apr. 9, 2024

(54) ELECTRONIC DEVICE

(71) Applicant: CANON KABUSHIKI KAISHA, Tokyo (JP)

(72) Inventors: Keisuke Fukuyo, Tokyo (JP); Takashi Yoshida, Kanagawa (JP); Yohei Yamada, Tokyo (JP); Kazuki Sugaya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 168 days.

(21) Appl. No.: 17/715,153

(22) Filed: Apr. 7, 2022

(65) Prior Publication Data

US 2022/0350368 A1 Nov. 3, 2022

(30) Foreign Application Priority Data

Apr. 28, 2021 (JP) ................................ 2021-075898

(51) Int. Cl.
*H04N 23/53* (2023.01)
*G06F 1/16* (2006.01)
*H04N 23/63* (2023.01)

(52) U.S. Cl.
CPC .......... *G06F 1/1652* (2013.01); *G06F 1/1681* (2013.01); *H04N 23/631* (2023.01); *H04N 23/633* (2023.01)

(58) Field of Classification Search
USPC ........................................................ 348/33
See application file for complete search history.

(56) References Cited

U.S. PATENT DOCUMENTS

| | | | | |
|---|---|---|---|---|
| 7,808,550 B2 * | 10/2010 | Misawa | ............... | H04N 23/531 348/333.01 |
| 10,691,173 B2 * | 6/2020 | Kim | ........................ | B32B 27/28 |
| 11,048,304 B2 * | 6/2021 | Kang | ........................ | G06F 1/16 |
| 11,079,797 B1 * | 8/2021 | Remez | ................ | H04M 1/0268 |
| 11,815,963 B2 * | 11/2023 | Baek | .................... | H04M 1/0277 |
| 2007/0279315 A1 * | 12/2007 | Laves | ................. | H04M 1/0268 345/1.1 |
| 2010/0041439 A1 * | 2/2010 | Bullister | ................. | G06F 1/165 455/566 |
| 2015/0055286 A1 * | 2/2015 | Eguchi | ............... | H10K 59/1213 361/679.26 |
| 2018/0330694 A1 * | 11/2018 | Klein | .................. | G06F 3/04186 |
| 2019/0018454 A1 * | 1/2019 | Jung | ..................... | G06F 1/1652 |
| 2020/0027425 A1 * | 1/2020 | Lee | ........................ | G06F 1/1652 |

(Continued)

FOREIGN PATENT DOCUMENTS

JP 2015-154223 A 8/2015

*Primary Examiner* — Nigar Chowdhury
(74) *Attorney, Agent, or Firm* — Cowan, Liebowitz & Latman, P.C.

(57) ABSTRACT

A body part of a camera includes a display that is at least partially flexible. A display part of the display includes a first display part and a second display part that are integrally formed. A hinge part that connects the first display part to the second display part to be rotatable relative to each other is provided in the vicinity of a bendable part located at a boundary of each display part. The display is bendable in accordance with rotation of the hinge part with the bendable part as a starting point. An operation member is disposed on a back surface of the second display part, and the operation member is exposed to the outside in a bent state of the display.

10 Claims, 11 Drawing Sheets

(56) References Cited

U.S. PATENT DOCUMENTS

| | | | |
|---|---|---|---|
| 2020/0170128 A1* | 5/2020 | Kim | G06F 1/1681 |
| 2020/0314552 A1* | 10/2020 | Kim | H04R 17/00 |
| 2020/0319672 A1* | 10/2020 | Kim | H04M 1/0216 |
| 2020/0329573 A1* | 10/2020 | Huang | G06F 1/1652 |
| 2020/0333834 A1* | 10/2020 | Seo | G06F 3/1446 |
| 2020/0396852 A1* | 12/2020 | Yoo | G06F 1/1652 |
| 2020/0401017 A1* | 12/2020 | Yamazaki | H04N 23/633 |
| 2021/0195009 A1* | 6/2021 | Choi | H04M 1/0237 |
| 2021/0243289 A1* | 8/2021 | Moon | H04N 5/2621 |
| 2021/0248347 A1* | 8/2021 | Seo | G06F 1/3231 |
| 2021/0248942 A1* | 8/2021 | Yoon | G01P 15/00 |
| 2021/0320992 A1* | 10/2021 | Song | F16H 19/04 |
| 2021/0352812 A1* | 11/2021 | Park | G06F 1/1652 |
| 2021/0352813 A1* | 11/2021 | Cho | G06F 1/1658 |
| 2021/0356998 A1* | 11/2021 | Park | H04M 1/022 |
| 2021/0360800 A1* | 11/2021 | Horiuchi | G06F 1/1616 |
| 2021/0365075 A1* | 11/2021 | Lin | H05K 5/0247 |
| 2021/0365079 A1* | 11/2021 | Weldon | G06F 1/1679 |
| 2021/0385311 A1* | 12/2021 | Kim | G06F 1/1677 |
| 2021/0389809 A1* | 12/2021 | Choi | G06F 1/1656 |
| 2021/0397228 A1* | 12/2021 | Yang | G06F 1/1652 |
| 2022/0038637 A1* | 2/2022 | Tokuchi | H04N 23/61 |
| 2022/0201108 A1* | 6/2022 | Kim | G06F 3/0383 |
| 2023/0209733 A1* | 6/2023 | Kim | H05K 5/0226 |
| | | | 361/809 |

* cited by examiner

ELECTRONIC DEVICE

BACKGROUND OF THE INVENTION

Field of the Invention

The present invention relates to an electronic device including a bendable display device.

Description of the Related Art

There are electronic devices in which a display part having a touch operation function is provided in a device body. Digital cameras, smartphones, and the like are provided with a liquid crystal display having a touch operation function, or a display part configured of a thinner organic EL or the like. In recent years, while reduction in size of a device body has progressed, an increase in size of a display part and a multi-display in which a plurality of screens can be viewed at the same time have come to be desired. Thus, there is a method of bending a display part having flexibility, thereby switching between a stored state in which a size of a device is small and a deployed state in which a display screen is large, and it is possible to achieve both portability and readability.

Japanese Patent Laid-Open No. 2015-154223 discloses a photographing device which is small in size and aims to improve operability during photographing and reproducing. The photographing device is provided with a monitor having a flexible part in a housing thereof. An operation unit pivotally supported by the housing has a support unit that supports the flexible part of the monitor in a state in which it is bent at a first rotation position and in a state in which it is extended at a second rotation position.

In the conventional technique disclosed in Japanese Patent Laid-Open No. 2015-154223, a display area of the monitor becomes smaller at the first rotation position. Further, at the second rotation position, when a user grips the photographing device, there is a possibility of erroneous operation in a case in which the user unintentionally touches the operation unit.

SUMMARY OF THE INVENTION

It is an object of the present invention to reduce a size of an electronic device while an increase in size of a screen of a display part and an improvement in operability during photographing are achieved.

An electronic device according to an embodiment of the present invention is an electronic device including a display that includes a plurality of display parts, in which the display includes a bendable part at a boundary of the plurality of display parts, the display is bendable at the bendable part due to rotation of a hinge part provided at a position corresponding to the bendable part, and an operation member is disposed on a back surface opposite to a display surface in the display parts.

Further features of the present invention will become apparent from the following description of exemplary embodiments with reference to the attached drawings.

DESCRIPTION OF THE EMBODIMENTS

An electronic device according to the present invention will be described in detail below with reference to the drawings. Although an application example of an imaging device is shown in an embodiment thereof, the present invention can be applied to various electronic devices including a bendable display device.

First Example

Figure 1A:
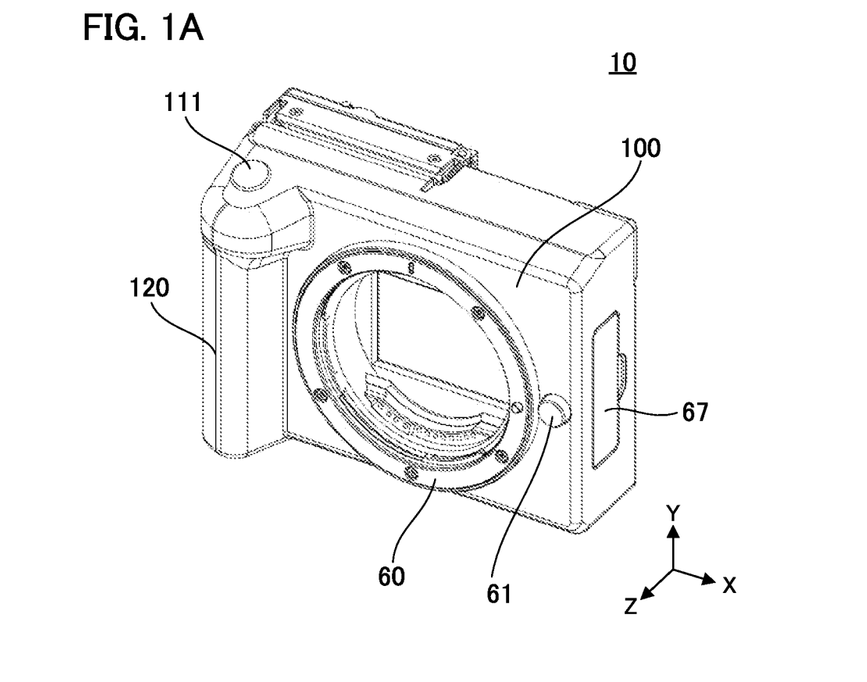
FIGS. 1A and 1B are external perspective views of an imaging device according to the present embodiment.
Figure 1B:
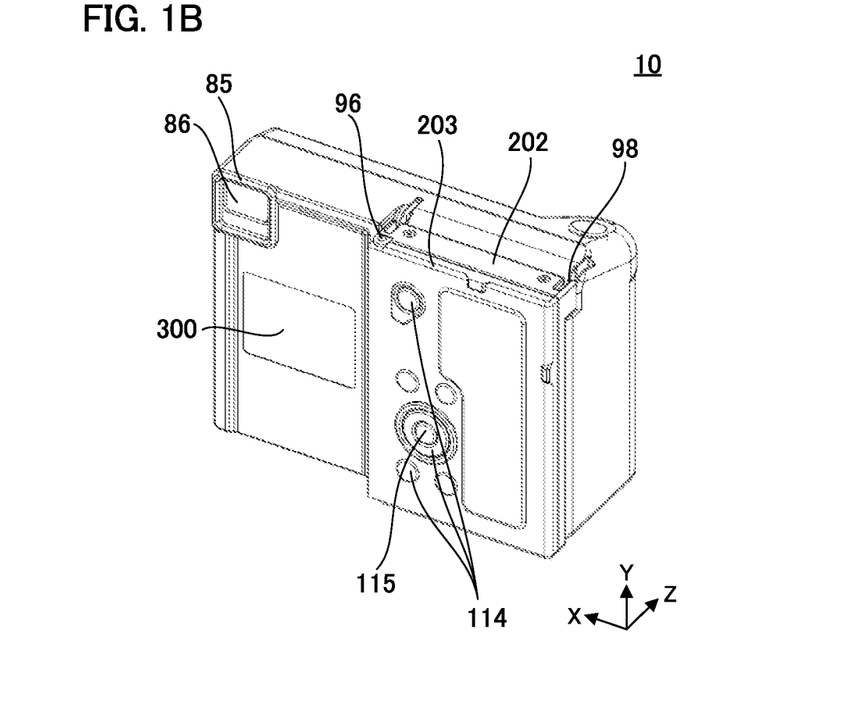
Figure 2:
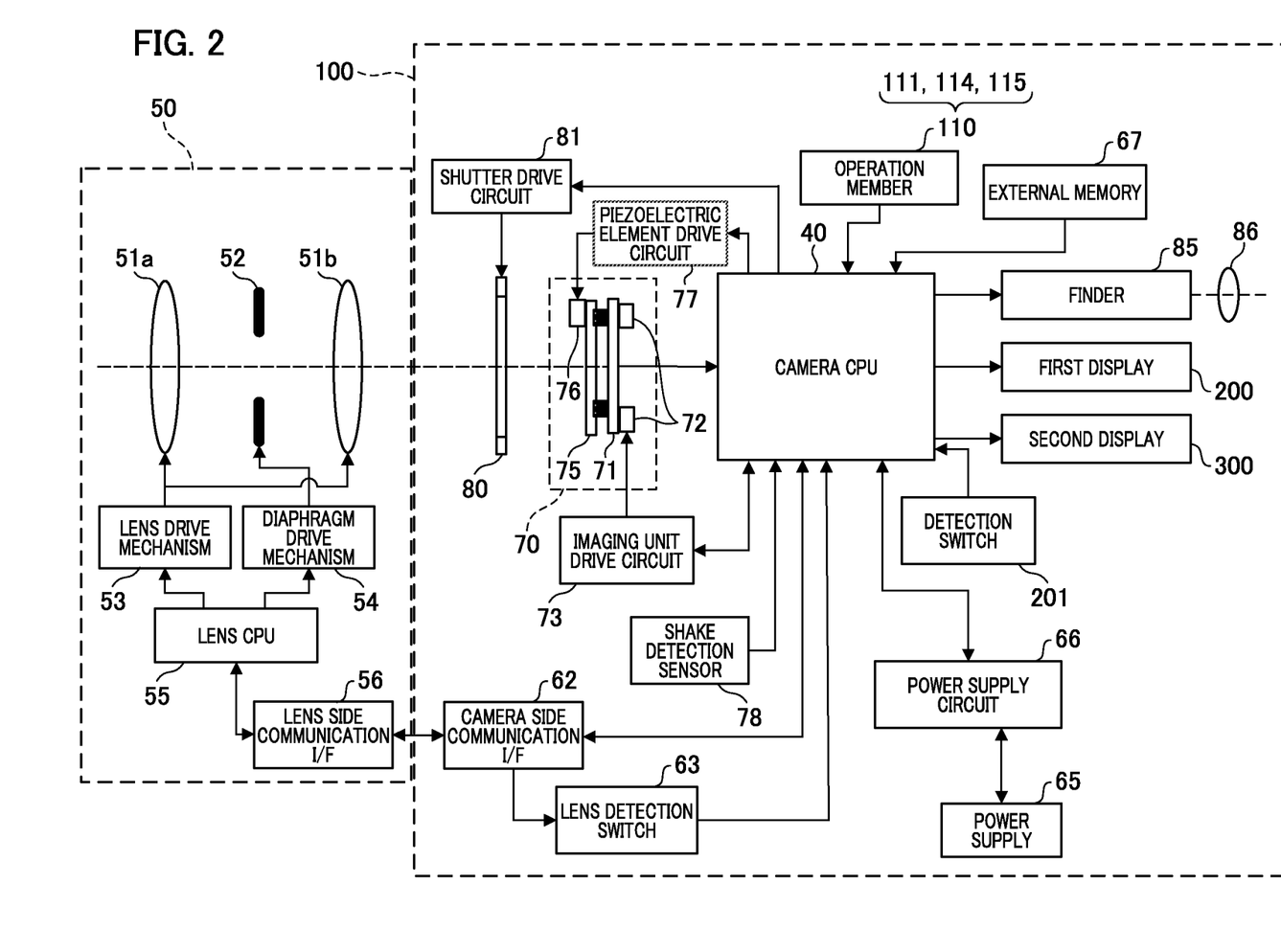
FIG. 2 is a block diagram for showing a functional configuration of the imaging device according to the present embodiment.

With reference to FIGS. 1A, 1B, and 2, an interchangeable lens type digital camera will be described as the imaging device of the present embodiment. A camera 10 includes a body part 100 that forms a housing. FIGS. 1A and 1B show the body part 100 in a state in which an interchangeable lens unit is not attached thereto. FIG. 1A is an external perspective view of the camera 10 from a front side, and FIG. 1B is a perspective view of the camera 10 from a back side. An optical axis direction of the camera 10 is defined as a Z axis direction, a lateral direction orthogonal to the Z axis direction is defined as a X axis direction, and a Y axis direction orthogonal to the Z axis direction is defined as a vertical direction. FIG. 2 is a block diagram showing a functional configuration of the camera 10.

The body part 100 has a grip part 120. The grip part 120 is a grip part for a user to hold the camera 10. The grip part 120 is provided at one end of the body part 100 and is formed in a curved shape so that the user can grip it with his or her palm and hook his or her fingers around it. A surface of the grip part 120 is made of an elastic member of such as synthetic rubber, so that good grippability can be obtained.

The camera 10 has a configuration in which a lens unit 50 (see FIG. 2) is attachable to and detachable from a mount opening part 60 on a front surface by pressing a lens attachment and detachment button 61. The lens unit 50 constitutes an imaging optical system and includes a focus lens Ma and a zoom lens 51b, which are configured of a plurality of lens groups. The lens unit 50 includes a diaphragm 52 that adjusts an amount of aperture. A lens drive mechanism 53 drives the focus lens 51a and the zoom lens 51b to perform focusing and zoom driving. A diaphragm drive mechanism 54 drives the diaphragm 52 and controls a diaphragm value. A lens central processing unit (CPU) 55 performs various signal processing and controls each part of the lens unit 50.

The body part 100 and the lens unit 50 are electrically connected to each other by a camera side communication interface (I/F) part 62 and a lens side communication I/F part 56 and can communicate with each other. Further, electric power is supplied from the body part 100 to the lens unit 50.

A camera CPU 40 is a central part that performs control of an imaging system and performs control of operations of each element of the camera 10. Hereinafter, the camera CPU 40 is simply referred to as a CPU 40. A lens detection switch 63 provided in the body part 100 outputs a detection signal for determining whether or not the body part 100 of the camera 10 and the lens unit 50 can communicate with each other via the camera side communication I/F part 62 and the lens side communication I/F part 56 to the CPU 40. Further, the lens detection switch 63 outputs a signal for identifying a type of the lens unit 50 mounted on the body part 100 to the CPU 40.

A power supply 65 that supplies electric power to each element of the camera 10 is, for example, a secondary battery configured of a battery pack that is attachable to and detachable from the body part 100. A power supply circuit 66 converts a voltage of the power supply 65 into a voltage required for operations of each element of the camera 10 and supplies the voltage to a circuit part.

A shutter 80 is configured of a focal plane shutter, is driven by a shutter drive circuit 81, and performs control of incidence of a photographing luminous flux by exposing and shielding an imaging element 71. The shutter drive circuit 81 can shift or hold the imaging element 71 to or in an exposed state (an open state) or a shielded state (a closed state) by opening and closing a shutter curtain (not shown).

The imaging element 71 takes in the luminous flux from the lens unit 50 to perform photoelectric conversion. For example, a complementary metal oxide semiconductor (CMOS) image sensor or a charge-coupled device (CCD) image sensor is used for the imaging element 71, which has an electronic shutter function.

An optical low-pass filter 75 is a rectangular optical element made of a material such as quartz, which is disposed in front of the imaging element 71. A piezoelectric element 76 adheres to and is held on a surface of the optical low-pass filter 75, and by applying a voltage, the optical low-pass filter 75 is vibrated in a wavy shape in the Z axis direction. A piezoelectric element drive circuit 77 performs control of energization of the piezoelectric element 76. The piezoelectric element drive circuit 77 is electrically connected to the piezoelectric element 76 via a flexible substrate for a piezoelectric element (not shown). By controlling the energization of the piezoelectric element 76, the optical low-pass filter 75 can be vibrated in a plurality of vibration modes having different orders. Thus, it is possible to remove dust adhering to the surface of the optical low-pass filter 75.

A shake detection sensor 78 is, for example, an angular velocity sensor, which periodically detects an angular velocity of a shake of the camera 10 and converts it into an electrical signal. An output of the shake detection sensor 78 is acquired by the CPU 40 as a detection signal of an amount of shake of the camera 10.

An imaging unit 70 includes the imaging element 71, the optical low-pass filter 75, the piezoelectric element 76, and an imaging unit drive mechanism 72. The imaging unit drive mechanism 72 is a mechanism for driving the imaging element 71 within a predetermined plane. For example, a drive coil (not shown), a permanent magnet (not shown), and a position detection sensor (not shown) for driving the imaging element 71 on a plane (X-Y plane) orthogonal to an optical axis of the camera 10 are provided.

An imaging unit drive circuit 73 is electrically connected to the imaging unit drive mechanism 72 via a flexible substrate for the imaging unit drive mechanism (not shown) and performs control of energization of the imaging unit drive mechanism 72. The CPU 40 acquires a detection signal of the shake detection sensor 78 and performs control of drive of the imaging unit 70 in a direction of canceling out the shake of the camera 10 in accordance with the detection result. Thus, it is possible to correct image blur caused by the shake of the camera 10.

An external memory 67 is configured of, for example, a semiconductor memory card that is attachable to and detachable from the body part 100 and stores data such as captured images.

A finder 85 is configured of an electronic viewfinder (EVF) and has an eyepiece optical system 86 provided in an upper left part of a back surface of the camera 10. The finder 85 performs display of a through image based on an image signal acquired by the imaging element 71, display of settings of the camera 10, and the like.

The body part 100 is provided with a first display 200 on the back surface. The first display 200 includes, for example, an organic electro-luminescence (EL) element as a display device. The first display 200 performs display of a through image acquired by imaging, display of settings of the body part 100, display of an image after photographing, and the like. The first display 200 is at least partially flexible and has a bendable configuration. Further, in a case in which the first display 200 has a touch panel function, an electrostatic capacitance type or pressure sensitive type touch detection part is built in, and the user can perform a touch operation thereon with a finger or the like. The first display 200 is attached to a first holding member 202 and a second holding member 203 (see FIG. 3A), which are formed by pressing sheet metal materials or molding resin materials. Also, details of a configuration of the first display 200 will be described later.

A detection switch 201 is configured of a magnet and a Hall element, or the like, and detects relative positions of the first holding member 202, the second holding member 203, and the body part 100. The detection switch 201 outputs a detection signal to the CPU 40.

A second display 300 is provided on a back surface of the body part 100 and is configured of a liquid crystal display (LCD) panel or the like that performs display of the settings of the body part 100. The CPU 40 controls display of the first and second displays.

The CPU 40 receives instructions from various operation members 110 and performs control of them. A plurality of buttons, dials, and the like for the user to perform the settings of the body part 100 and an instruction of a photographing operation are provided on atop surface of the body part 100 and a back surface of the second holding member 203. Specifically, as shown in FIG. 1A, there is a shutter button 111 for performing the instruction of the photographing operation, and as shown in FIG. 1B, there are a selection button 114 for selecting various settings and a setting button 115 for determining various settings. In the present example, an operation unit including the selection button 114 and the setting button 115 is shown as an operation member 110 provided on the back surface of the second holding member 203.

A hinge part 96 (see FIG. 1B) connects the first holding member 202 to the second holding member 203 to be rotatable relative to each other. Details of the hinge part 96 will be described later. A connection member 98 is a member constituting a connection part that connects the body part 100 to the first holding member 202 to be rotatable relative to each other.

Figure 3A:
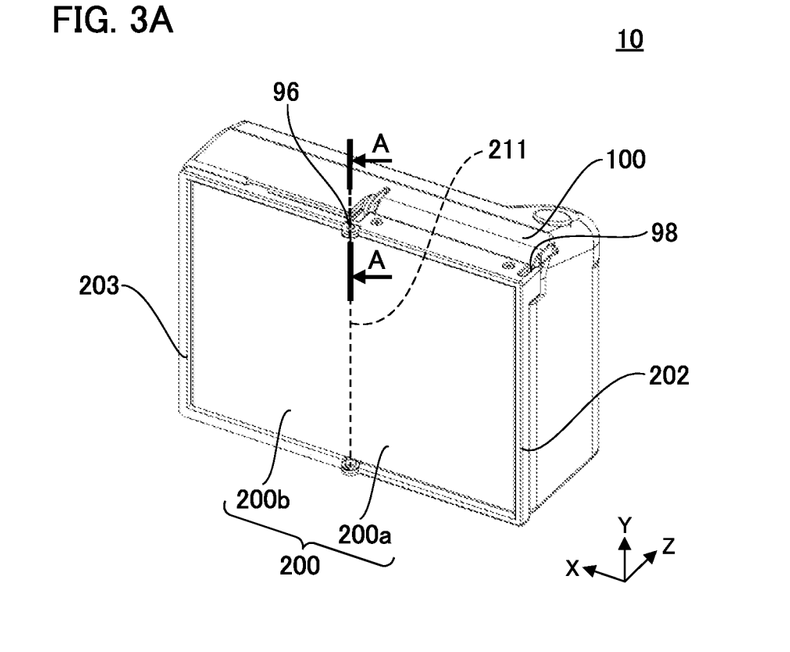
FIGS. 3A and 3B are external perspective views for showing a deployed state and a stored state of a display.
Figure 3B:
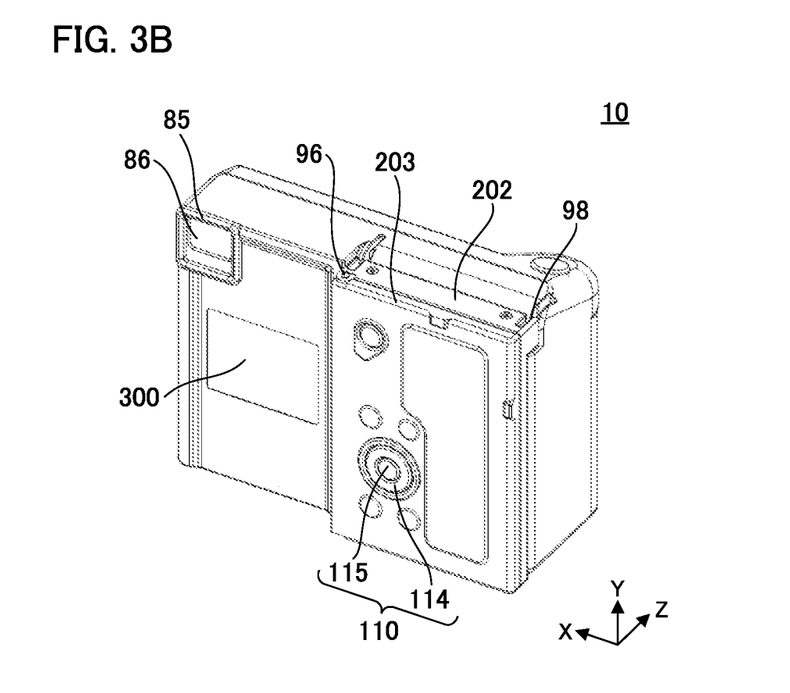
Figure 4:
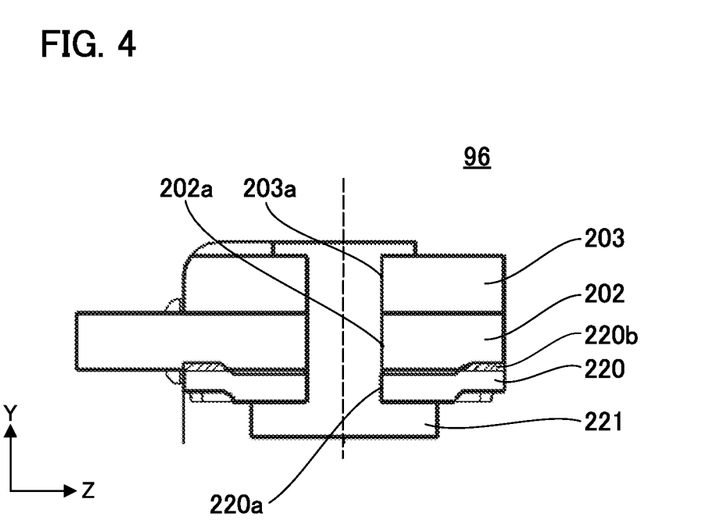
FIG. 4 is a cross-sectional view along line A-A in FIG. 3A.

Next, a configuration in which the first display 200 can be bent will be described with reference to FIGS. 3A to 4A. FIG. 3A is an external perspective view of a deployed state of the first display 200 from the back side. FIG. 3B is an external perspective view of a stored state of the first display 200 from the back side. FIG. 4 is a cross-sectional view along line A-A in FIG. 3A, which shows the hinge part 96.

A display part of the first display 200 is made of a rectangular and thin film-like material configured of an organic EL or the like. The first display 200 has a bendable configuration due to a bendable part 211 provided at a predetermined position in a longitudinal direction thereof (the X axis direction in FIGS. 3A and 3B). Further, the first display 200 is divided into a first display part 200a and a second display part 200b which are virtually divided in the bendable part 211.

Although the form in which the first display 200 is attached to and held by the first holding member 202 and the second holding member 203 with double-sided tape or the like has been shown in the present example, other known techniques may be used. For example, there is a form in which front and back surfaces of the first display 200 in a thickness direction thereof (the Z axis direction in the figure) are respectively fitted into groove shapes provided in the first holding member 202 and the second holding member 203.

The hinge part 96 is provided at a position corresponding to both ends of the bendable part 211 in the Y axis direction in the figure. A detailed configuration of the hinge part 96 will be described with reference to FIG. 4. A first insertion hole 202a is formed in the first holding member 202 in the Y axis direction in the figure. A second insertion hole 203a is formed in the second holding member 203 in the Y axis direction in the figured. A disc spring 220 is a substantially circular member formed by pressing a sheet metal material or the like, and an insertion hole 220a is formed therein in the Y axis direction in the figured. Further, the disc spring 220 is provided with a biasing part 220b formed as a convexly shaped part in a part of an outer diameter thereof.

A shaft 221 is made of a metal material and has a shaft-shaped part inserted into the insertion hole 220a, the first insertion hole 202a, and the second insertion hole 203a. The first holding member 202 and the second holding member 203 are configured to be rotatable about an axis center of the shaft 221. Further, by pressing the biasing part 220b against a part of the first holding member 202, a frictional force is generated, so that a relative position between the first holding member 202 and the second holding member 203 can be set to a desired position.

In the present example, a so-called uniaxial hinge configuration, in which the first holding member 202, the second holding member 203, and the disc spring 220 are sandwiched and held by the shaft 221, has been used for a configuration of the hinge part 96, but other known techniques may be used. For example, a so-called two-axis hinge configuration in which the disc spring 220 and the shaft 221 are provided on each of the first holding member 202 and the second holding member 203, and the respective shafts 221 are connected to each other may be used. Further, each of the first holding member 202 and the second holding member 203 may be connected by an elastic member such as synthetic rubber.

The bendable part 211 is provided at substantially the same position as the hinge part 96 in the longitudinal direction of the first display 200 (X axis direction in FIGS. 3A and 3B). That is, when the first holding member 202 and the second holding member 203 rotate relative to each other with respect to an axis center of the hinge part 96, the first display 200 bends with the bendable part 211 as a starting point.

Figure 5A:
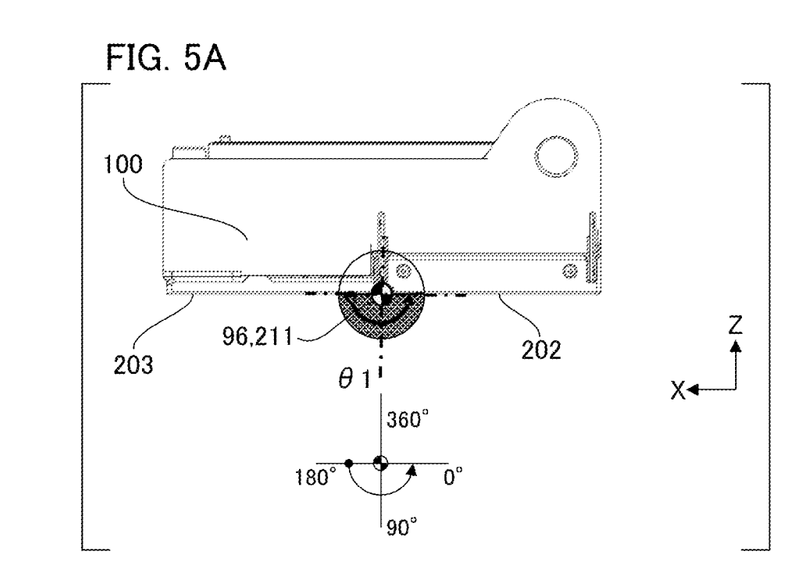
FIGS. 5A to 5C are diagrams for explaining an angle range of a rotatable part of the display.
Figure 5B:
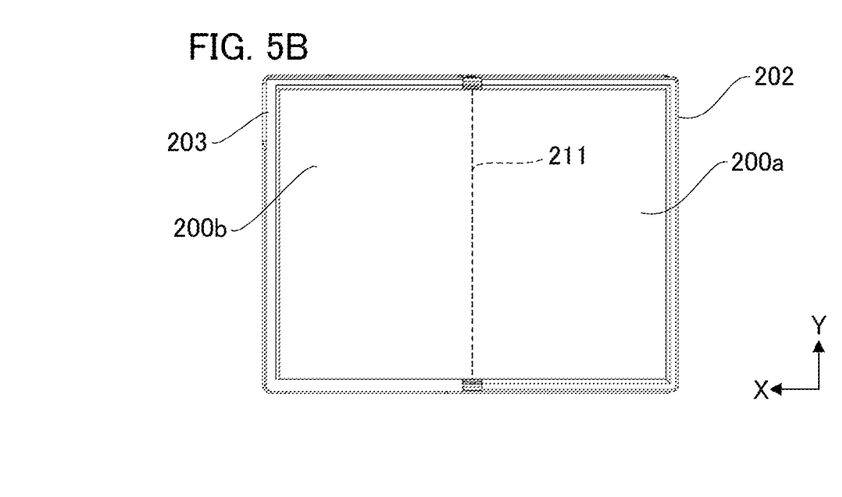
Figure 5C:
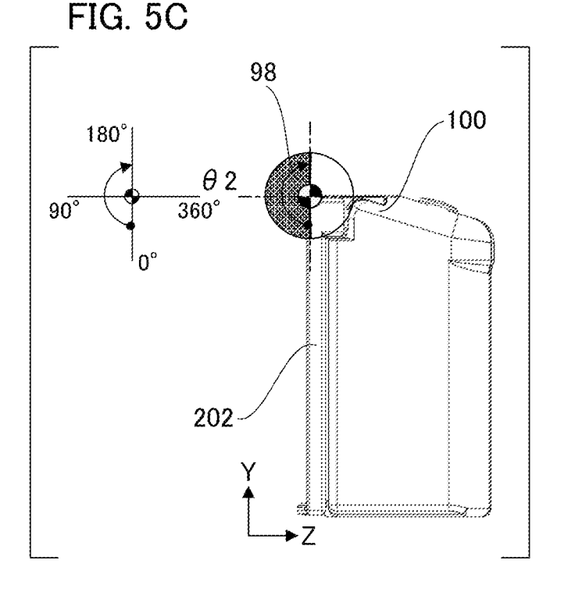

As described above, the first display 200 has a configuration in which it can be transformed into the stored state (the state in FIG. 3B) in which it is bent, and the deployed state (the state in FIG. 3A). A bendable range of the first display 200 will be described with reference to FIGS. 5A to 5C. FIG. 5A is a diagram of the deployed state of the first display 200 when viewed from the top surface side. FIG. 5B is a diagram of the deployed state of the first display 200 when viewed from the back surface side. FIG. 5C is a diagram of the deployed state of the first display 200 when viewed from a side surface side.

In FIG. 5A, a rotation angle when the first holding member 202 and the second holding member 203 rotate relative to each other about the axis center of the hinge part 96 is expressed as θ1. An angle range of θ1 is as follows.

$$0° \leq \theta1 \leq 180°$$

When θ1 is 180°, the first holding member 202 and the second holding member 203 are in a state in which they are substantially parallel. From this state, when the second holding member 203 rotates counterclockwise around an axis of the hinge part 96, it can transition to a state in which θ1 is 0° in which the first holding member 202 and the second holding member 203 are superposed on each other in the Z axis direction in the figure. When the first holding member 202 and the second holding member 203 rotate counterclockwise around the axis of the hinge part 96, the first display 200 bends with the bendable part 211 as a starting point.

In FIG. 5C, a rotation angle at which the body part 100 and the first holding member 202 rotate relative to each other substantially around an axis of the connection member 98 is expressed as θ2. An angle range of θ2 is as follows.

$$0° \leq \theta2 \leq 180°$$

When θ2 is 0°, the body part 100 and the first holding member 202 are superposed on each other in the Z axis direction. From this state, when the first holding member 202 rotates clockwise substantially around the axis of the connection member 98, it can transition to a state in which θ2 is 180° in which the first holding member 202 is substantially parallel to the body part 100.

Figure 6A:
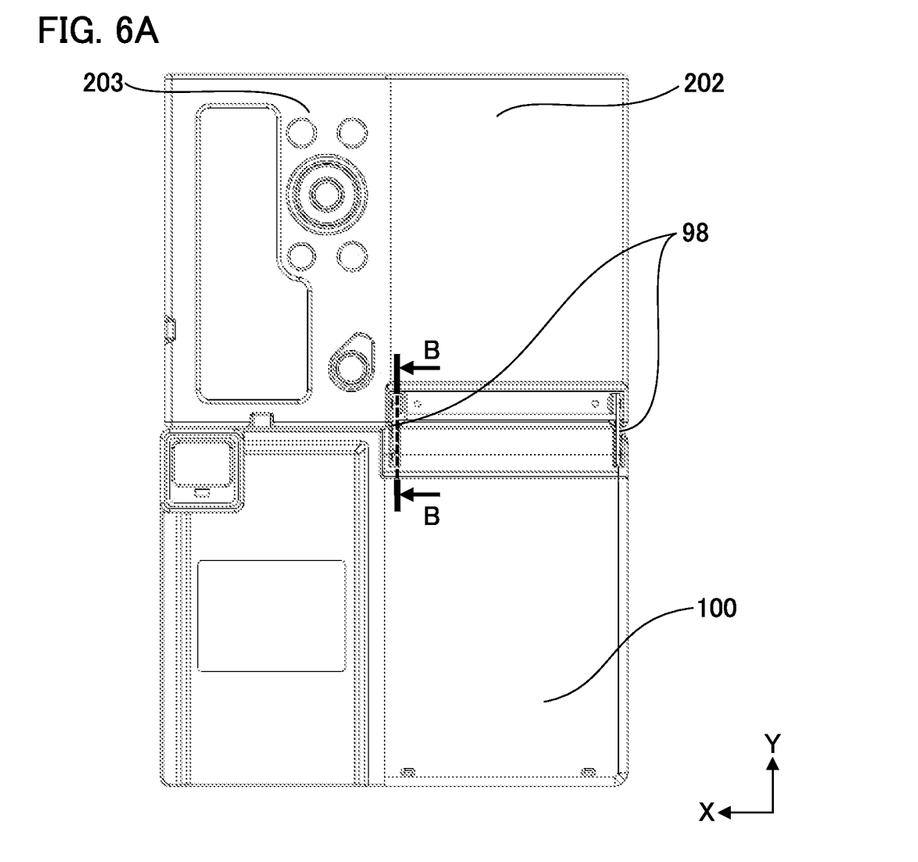
FIGS. 6A and 6B are diagrams for explaining a state of the display with respect to a body part and a connection part.
Figure 6B:
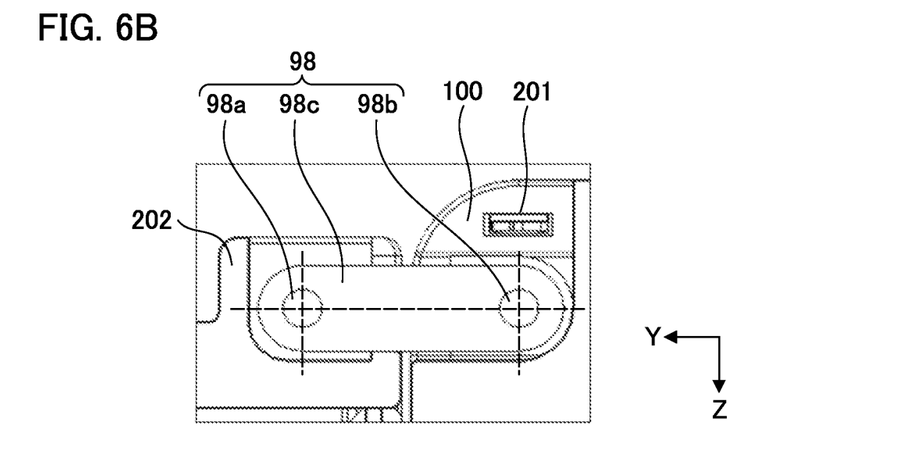

A configuration of the connection member 98 will be described with reference to FIGS. 6A and 6B. FIG. 6A is an external view of the first display 200 from the back side in a state in which the first display 200 is transitioned to a position in the vertical direction (+Y axis direction) with respect to the body part 100. The connection part configured of the connection member 98 is rotatable in a direction perpendicular to a development direction (X axis direction) of the first display 200. In FIG. 6A, the first display 200 is in a state in which it is rotated by approximately 180° about an axis parallel to the X axis with respect to the body part 100. FIG. 6B is a cross-sectional view along line B-B in FIG. 6A of the connection member 98.

A display-side hinge part 98a and a body-side hinge part 98b are provided respectively in the first holding member 202 and the body part 100. Each hinge part is configured of a leaf spring (not shown) and a shaft (not shown). This is a so-called two-axis hinge configuration in which axis centers of each biasing part having the shaft and the leaf spring are connected to each other using a connection member 98c made of a sheet metal material or the like. Thus, the first display 200 is configured to be rotatable about the X axis in the figure about an axis center of each of the display-side hinge part 98a and the body-side hinge part 98b with respect to the body part 100. The first display 200 is configured to be able to transition to a position in the vertical direction (+Y axis direction in the figure) with respect to the body part 100.

It is possible to adopt the same configuration as the hinge part 96 for the display side hinge part 98a and the body side hinge part 98b. Thus, it is possible to hold the relative position between the first display 200 and the body part 100 at a desired position.

The detection switch 201 is provided in the vicinity of the connection member 98 of the body part 100. The detection switch 201 is an angle detection switch configured of a substrate-mounted electronic switch. The connection member 98c rotates about an axis of the hinge part 98b on the body side around the X axis in the figure and a lever (not shown) of the detection switch 201 is pushed, so that the relative position of the first display 200 with respect to the body part 100 can be detected.

Next, effects of the present example will be described with reference to FIGS. 7A to 9B. FIGS. 7A to 9B are external perspective views showing a combination of angles of each rotatable part that the first display 200 can take with respect to the body part 100. In FIGS. 7A to 9B, A is a perspective view of the front surface, and B is a perspective view of the back surface.

Figure 7A:
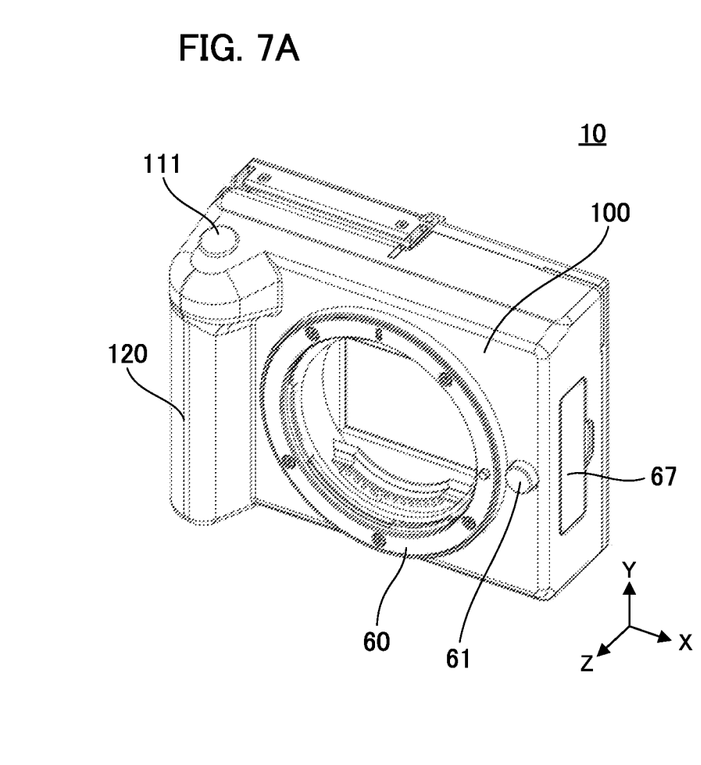
FIGS. 7A and 7B are external perspective views for showing the deployed state of the display.
Figure 7B:
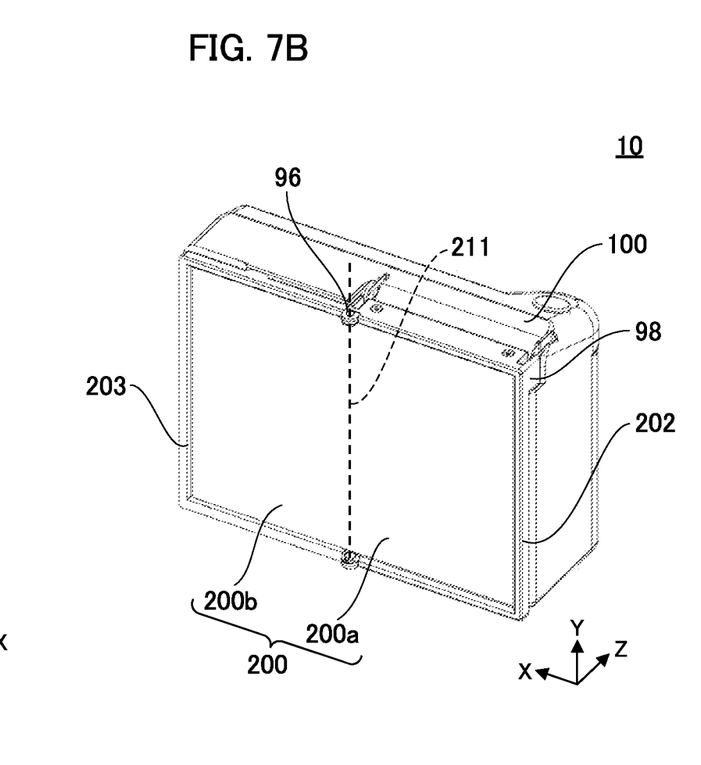

FIGS. 7A and 7B show a posture of the first display 200 with respect to the body part 100 when each rotatable part is in the following state.

$\theta1=180°, \theta2=0°$

When the first display 200 is in the state shown in FIGS. 7A and 7B, the finder 85, the second display 300, and the operation member 110 are in a state in which they are not exposed to the outside, and the first display part 200a and the second display part 200b are in a state in which they are exposed thereto. Since a display area of the first display 200 can be maximized and used, the user can easily check live view photographing and reproduced images while checking a screen having a large display area.

Figure 8A:
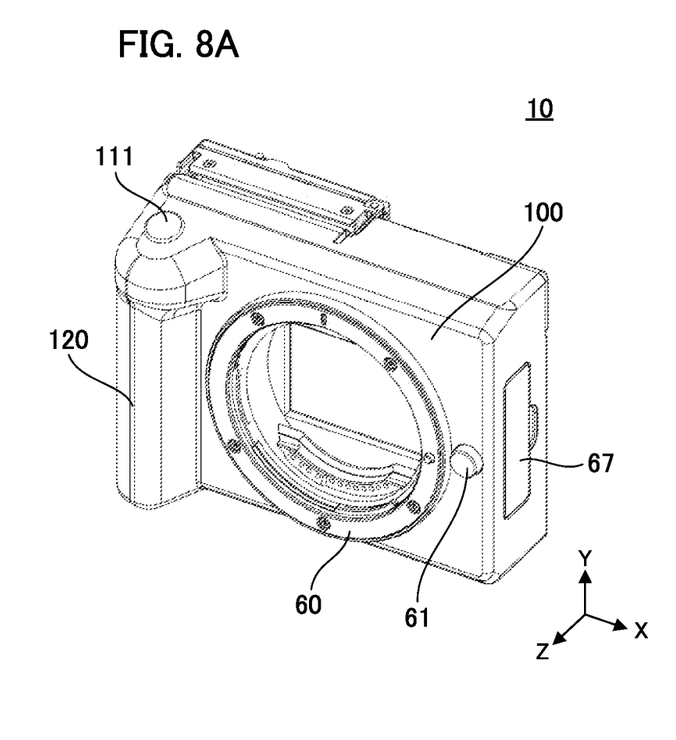
FIGS. 8A and 8B are external perspective views for showing the stored state of the display.
Figure 8B:
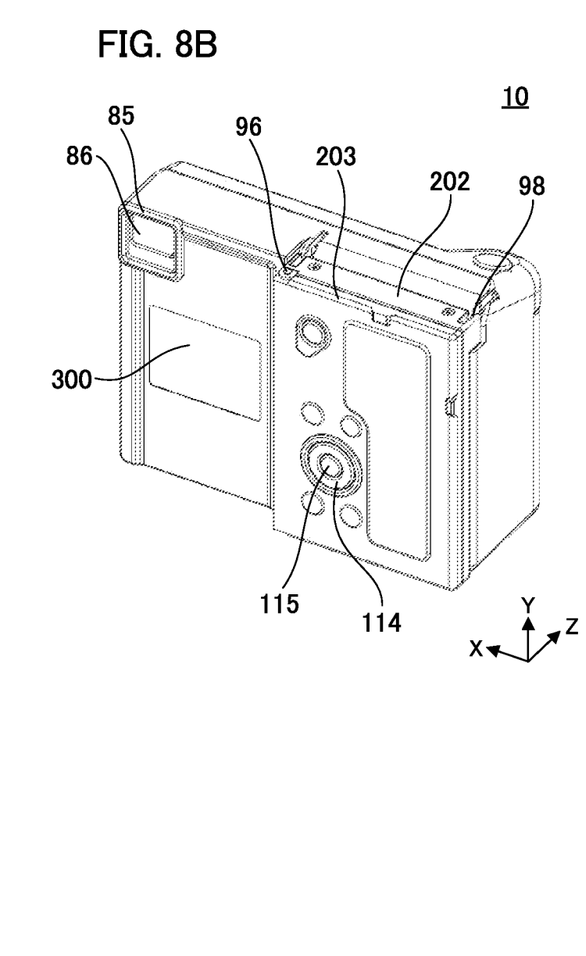

FIGS. 8A and 8B show a posture of the first display 200 with respect to the body part 100 when each rotatable part is in the following state.

$\theta1=0°, \theta2=0°$

When the first display 200 is in the state shown in FIGS. 8A and 8B, the first display part 200a and the second display part 200b are in a state in which they are not exposed to the outside, and the finder 85, the second display 300, and the operation member 110 are in a state in which they are exposed thereto. The operation member 110 (the selection button 114 and the setting button 115) is a physical button having a dial or push button structure, and thus even when the user' eye is in contact with the finder 85, the user can operate the operation member 110 without confirming the position each time. Accordingly, photographing in a state of eye-contact to the finder 85 becomes easy.

Figure 9A:
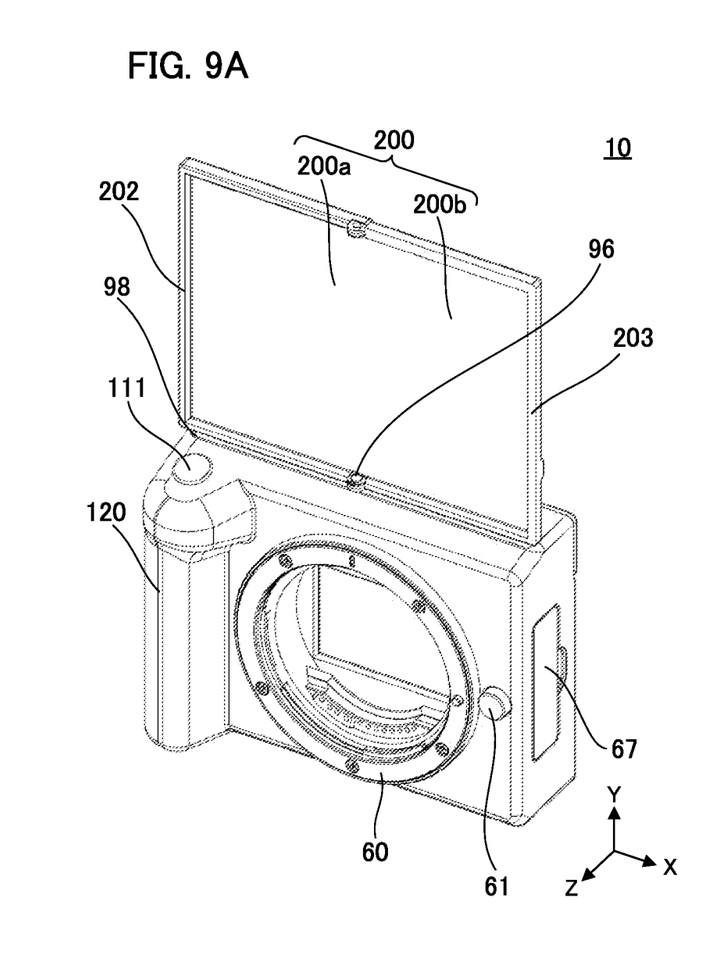
FIGS. 9A and 9B are external perspective views for showing a state in which a display part of the display faces a subject side.
Figure 9B:
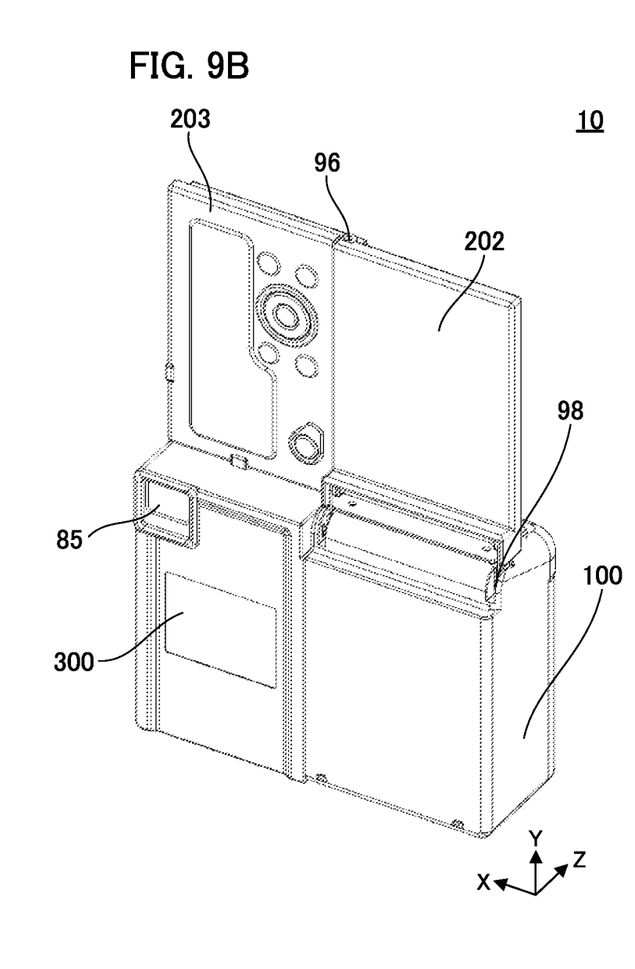

FIGS. 9A and 9B show a posture of the first display 200 with respect to the body part 100 when each rotatable part is in the following state.

$\theta1=180°, \theta2=180°$

When the first display 200 is in the state shown in FIGS. 9A and 9B, the first display part 200a and the second display part 200b are in a state in which they face the lens unit 50 side (a subject side). In this state, even when the first display 200 is transitioned to a position above (+Y axis direction in the figure) the body part 100, the first holding member 202 and the second holding member 203 are rotatable relative to each other without interfering with the body part 100. At this time, in the first display 200, the first display part 200a and the second display part 200b face the subject side. Accordingly, at the time of taking a self-portrait (photographing in which a photographer himself or herself is a subject), the photographer can perform photographing while checking photographed images and facial expressions, which is convenient.

Figure 10:
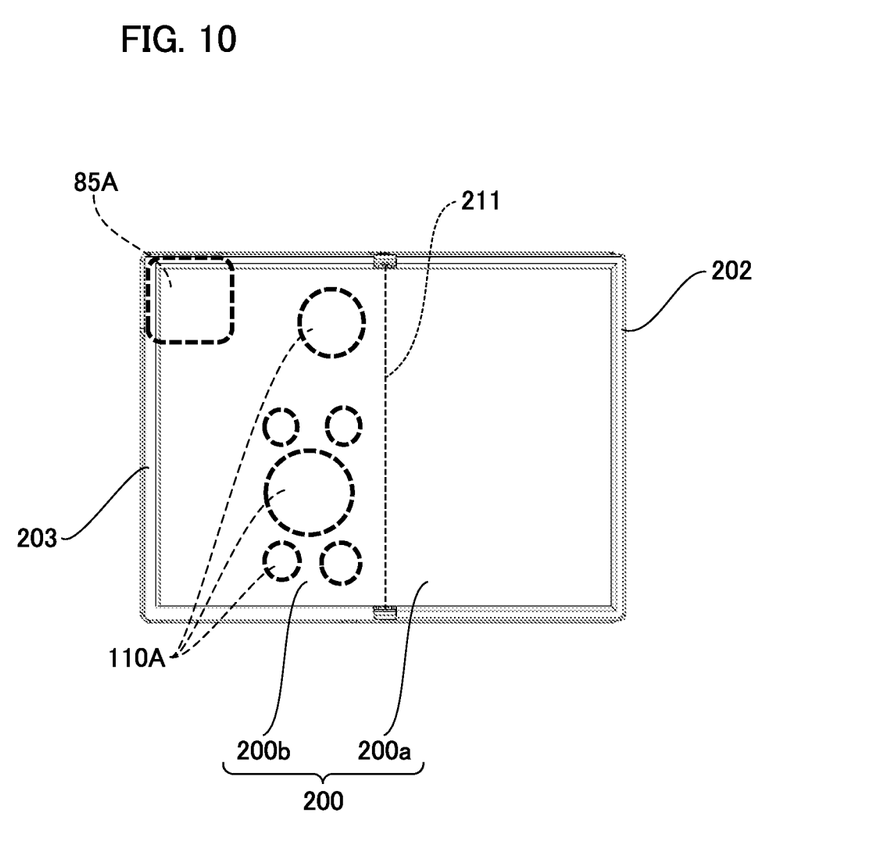
FIG. 10 is a rear view for showing a relationship between a finder and an operation member in the deployed state of the display.

A relationship between the finder 85 and the operation member 110 with respect to the first display 200 will be described with reference to FIG. 10. FIG. 10 is a back side view showing the relationship between the finder 85 and the operation member 110 (see regions 85A and 110A shown by broken line frames) in the deployed state of the first display 200. In the deployed state of the first display 200, the region 85A showing a projection of the finder 85 and the region 110A showing a projection of the operation member 110 are disposed in a positional relationship in which they do not face each other. Thus, it is possible to inhibit an increase in thickness of the body part 100, that is, a thickness thereof in the Z axis direction, which contributes to reduction in size of the camera 10.

According to the present example, it is possible to reduce a size of the electronic device while an increase in screen size of a display and an improvement in operability during photographing are realized.

Second Example

Figure 11A:
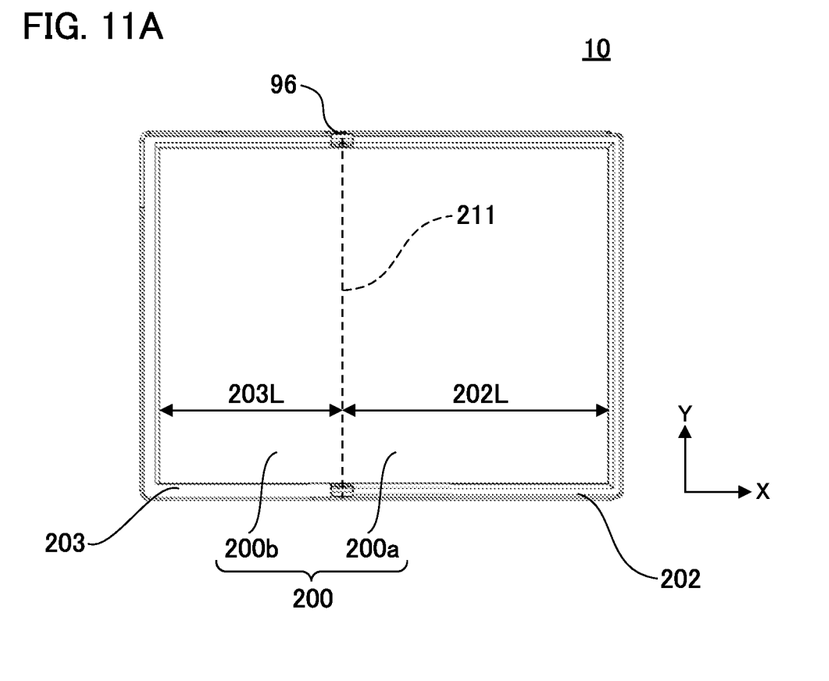
FIGS. 11A and 11B are rear views for showing a deployed state and a stored state of a display according to a second example.
Figure 11B:
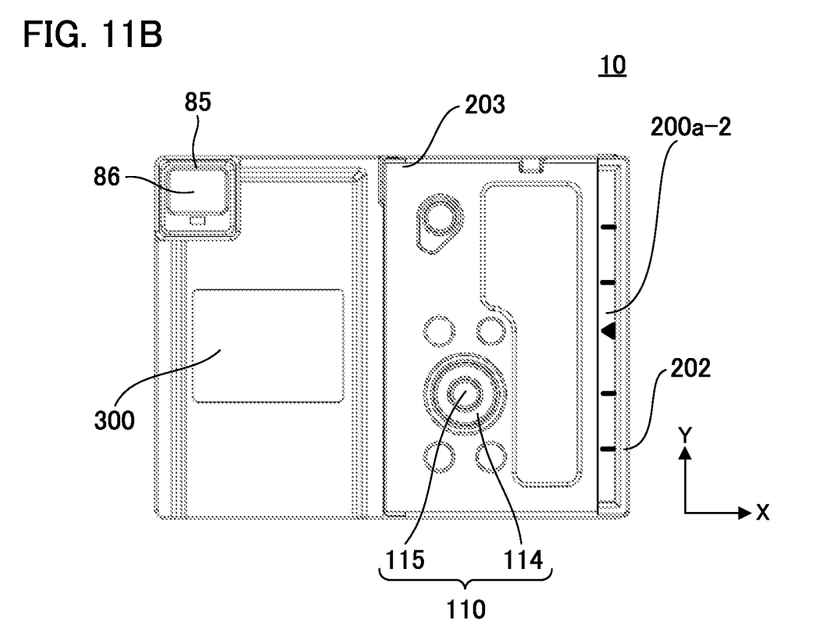

An electronic device according to a second example of the present invention will be described with reference to FIGS. 11A and 11B. In order to simplify the description in the present example, only differences in structure from the first embodiment will be described. FIG. 11A is a back side view showing the electronic device in a deployed state of a first display. FIG. 11B is a back side view showing the electronic device in a stored state of the first display.

A size of a part corresponding to the first display part 200a in the X axis direction in the first holding member 202 is expressed as 202L. A size of a part corresponding to the second display part 200b in the X axis direction in the second holding member 203 is referred to as 203L. A size of each holding member in the X axis direction satisfies the following inequality.

$202L > 203L$

That is, by forming the first holding member 202 to have a configuration with a wider width in the X axis direction, it is possible to expose a part 200a-2 of the first display part 200a in the stored state of the first display 200, as shown in FIG. 11B.

By performing display for operation along the part 200a-2 (an exposed part) of the first display part 200a, the configuration in which the user can perform a slide operation while holding his or her fingers along the second holding member 203 is obtained. That is, since the user can perform a slide touch operation, the user can quickly give operation instructions for changing various settings. As a specific example, a numerical value indicating ISO sensitivity is displayed on the part 200a-2 (exposed part) of the first display part 200a. By performing the slide touch operation along the second holding member 203, the user can change a sensitivity value to an arbitrary value with movements of fingers, and thus the operability is improved.

According to the present example, it is possible to provide the electronic device in which operability in photographing settings and the like can be further improved.

Other Embodiments

Although the examples of the display having the first and second display parts have been described in the above embodiments, the present invention can be applied to an electronic device having three or more display parts. In this case, the display, which is at least partially flexible, has a plurality of bendable parts at boundaries of each display part. The display is bendable at the plurality of bendable parts due to rotation of hinge parts provided at positions corresponding to the bendable parts. For example, a display having three or more display parts can be in a deployed state in which it is developed in a predetermined direction and in a plurality of bent states in which it is bent at each bendable parts. An operation member is disposed on a back surface on a side opposite to a display surface of any of the three or more display parts and is exposed to the outside of the electronic device in a bent state thereof. On the other hand, in the deployed state of the display, a display unit (finder, or other display parts) different from the display is in a state in which it is not exposed. A configuration in which the operation member for setting is not exposed in the deployed state of the display is an effective measure for inhibiting occurrence of erroneous operation.

Further, in the above examples, the example of an interchangeable lens type digital camera has been shown as the imaging device, but the present invention can be applied to a camera in which a lens unit is integrated with a body part.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-075898, filed Apr. 28, 2021, which is hereby incorporated by reference wherein in its entirety.

What is claimed is:

1. An electronic device comprising a display including a plurality of display parts,
   wherein the display includes a bendable part at a boundary of the plurality of display parts,
   wherein the display is bendable at the bendable part due to rotation of a hinge part provided at a position corresponding to the bendable part, and an operation member is disposed on a back surface opposite to a display surface in the display parts,
   wherein the display is at least partially flexible, and the display parts include a first display part and a second display part,
   wherein the hinge part connects the first display part to the second display part to be rotatable relative to each other,
   wherein the operation member is disposed on a back surface of the second display part,
   wherein the display is attached to a body part of the electronic device via a connection part,
   wherein the display is able to be developed in a first direction, and
   wherein the connection part is rotatable in a second direction perpendicular to the first direction.

2. The electronic device according to claim 1,
   wherein the display is able to be in a first state of being developed in the first direction and a second state of being bent at the bendable part, and
   wherein the operation member is exposed in the second state.

3. The electronic device according to claim 2,
   wherein the body part of the electronic device includes a display unit different from the display, and
   the display unit is exposed in the second state.

4. The electronic device according to claim 3, wherein the display unit is a display that constitutes a finder having an eyepiece optical system or is disposed at a position different from that of the finder in the body part.

5. The electronic device according to claim 3, wherein in the first state, the operation member and the display unit are at positions at which they do not face each other.

6. The electronic device according to claim 3, wherein in the first state, a length of the first display part in the first direction is longer than a length of the second display part in the first direction.

7. The electronic device according to claim 6, wherein in the second state, the first display part includes an exposed part that is partially exposed, and display and touch operations are possible with the exposed part.

8. The electronic device according to claim 1 further comprising an image sensor, wherein the display including the plurality of display parts displays an image captured by the image sensor.

9. The electronic device according to claim 8, wherein the display including the plurality of display parts is able to be in a first state of being developed in the first direction, a second state of being bent at the bendable part, and a third state in which the plurality of display parts face a subject side.

10. The electronic device according to claim 8, wherein the operation member is a member used for selecting or determining photographing settings.

* * * * *